Patented Feb. 1, 1927.

1,616,358

UNITED STATES PATENT OFFICE.

EMANUEL FABIAN, OF BERLIN-CHARLOTTENBURG, GERMANY, ASSIGNOR TO THE FIRM HERMANN HURWITZ & CO., OF BERLIN, GERMANY.

PROCESS OF MULTIPLYING ORIGINAL RECORDS AND THE PLATES USED IN SAID PROCESS.

No Drawing. Application filed June 15, 1926, Serial No. 116,230, and in Germany December 18, 1924.

My invention relates to improvements in the process of multiplying original records, and more particularly in the process described in the patent of the United States No. 1,067,652. As has been described in the said patent duplicates from original records are made by first applying a very thin layer of a suitable preparation on an inert plate, thereafter placing thereon the original record drawn or written in a special ink, the character of the preparation and ink being such that the ink reacts on the preparation so that the parts thereof acted upon by the ink are capable of taking up fatty dye-stuffs while the other parts which have not been acted upon by the ink repel such dye-stuffs. After treating the plate with a suitable fatty dye-stuff the duplicates are taken therefrom in the usual way. As described in the said patent, the plates used in the method were made from glass or other silicates.

I have discovered that certain metals can be used for making therefrom suitable carriers for the said preparations, which metals are likewise inert and therefore are not acted upon by acid or alkaline preparations. The said inert metallic carriers may be provided on foundations made from other material, and they may be for example in the form of metallic coatings, such as chromium or chromium alloys. Further, the whole carrier may be made from inert metal. The carrier and its coating may be made in the form of plates, rollers, cylinders, etc.

Suitable materials to be used as carriers for the said preparations are for example the stainless steels such for example as steel having a high percentage of chromium and a comparatively small percentage of carbon, which steels are perfectly indifferent as against the acid or alkaline preparations, so that they can be used in the same way as plates made from glass. I have found that it is not necessary to roughen the said metals preparatory to applying the preparation thereto, the natural rough surface condition caused by rolling being sufficient for taking up the preparation. As compared to carriers made from glass or the like the inert metallic carriers are preferable because comparatively thin carriers may be used, so that the said carriers have a low weight. Further, the said carriers can readily be used in any desired form. For example they may be in the form of rolls.

The preparation used for coating the surface of the said metallic carrier may be for example the one described in the aforesaid Patent No. 1,067,652, which preparation consists of about 20 parts by weight of hygroscopic sugar or glycerin, about 10 parts by weight of aluminium and magnesium salts in about equal parts, and from 2 to 3 parts by weight of hydrochloric acid and an alkaline salt, the whole being dissolved in about 65 parts of water. As an example, the ink capable of reacting on the said preparations consists of ammonia having ferrogallate suspended therein, or any other suitable alkaline solution such as ammonium carbonate, or solutions or suspensions of metallic oxids or hydrates such as ferric oxid or hydrate, or the fixed alkalis in caustic or carbonate form. Organic salts capable of forming insoluble substances in contact with the hygroscopic solution may likewise be employed in solution or suspension.

After the original prepared by the said ink has acted on the coating for a short time, the coating is treated with a suitable solution such for example as solutions of borates, organic acids, or their alkaline salts such as the aromatic hydrocarbons, cinnamic acid, salicylic acid, benzoic acid or the like, the acid or salt being dissolved in glycerin or similar hygroscopic liquid.

After the original has thus been transferred to the carrier the surface is inked, whereupon the prints are taken therefrom in the usual manner.

I claim:

1. The method of a producing printing surface which comprises applying a coating containing a material capable of reaction with an ink containing an alkaline precipitating agent to a metallic surface substantially inert to the coating material and the ink, thereafter applying thereto an original produced with an ink containing an alkaline precipitating agent, the said material and the ink of the original being such that by reaction of the ink upon the material the portions thereof subject to reaction are capable of taking up fatty inks while the portions not reacted upon repel the said inks.

2. The herein described method of producing printing surfaces which comprises applying a coating to a carrier made from stainless steel, and causing an original to react on the coating, the coating and the ink of the original being such that by the reaction of the ink on the coating the portions thereof subject to the reaction are capable of taking up fatty dye-stuffs, while the blank portions repel the said dye-stuffs.

3. The herein described foundation for reproducing originals which consists of an inert metallic carrier provided with a coating capable of reacting with the ink in which the original is made so as to take up fatty inks at the points where reaction takes place.

In testimony whereof I hereunto affix my signature.

EMANUEL FABIAN.